(12) United States Patent
Michienzi et al.

(10) Patent No.: US 12,741,384 B2
(45) Date of Patent: Sep. 22, 2026

(54) ROBOTIC SYSTEM FOR OBJECT MANIPULATION PLACEMENT AND MARKING

(71) Applicant: Ontario, Ltd. (Canadian Corp), Windsor (CA)

(72) Inventors: Therese Michienzi, Tecumseh (CA); Joseph Z. Sleiman, Windsor (CA)

(73) Assignee: Ontario, Ltd. (Canadian Corp), Windsor, CA (US)

( * ) Notice: Subject to any disclaimer, the term of this patent is extended or adjusted under 35 U.S.C. 154(b) by 167 days.

(21) Appl. No.: 18/905,371

(22) Filed: Oct. 3, 2024

(65) Prior Publication Data

US 2025/0128424 A1 Apr. 24, 2025

Related U.S. Application Data

(60) Provisional application No. 63/544,868, filed on Oct. 19, 2023.

(51) Int. Cl.
*B25J 11/00* (2006.01)
*B25J 9/00* (2006.01)
*B41J 3/407* (2006.01)

(52) U.S. Cl.
CPC ......... *B25J 11/0075* (2013.01); *B25J 9/0093* (2013.01); *B41J 3/40731* (2020.08)

(58) Field of Classification Search
CPC .. B41J 3/4073; B41J 3/40731; B25J 11/0075; B25J 9/0093
See application file for complete search history.

(56) References Cited

U.S. PATENT DOCUMENTS 9,352,872 B2 5/2016 Wojdyla et al.
11,571,911 B2 2/2023 Zhang
11,718,086 B2 8/2023 Rudolph
11,745,509 B2 9/2023 Elaarag
11,872,826 B1 * 1/2024 Crum ...................... B41J 29/13
11,884,444 B2 1/2024 Ghere
2003/0080181 A1 * 5/2003 Mizuguchi ....... G07B 17/00508 235/375
2014/0063096 A1 * 3/2014 Pitz ...................... B25J 15/0057 347/9
2018/0148272 A1 * 5/2018 Wagner ................ B65G 47/902
2018/0273298 A1 * 9/2018 Wagner ................ B65G 1/1378
2020/0071015 A1 3/2020 Fan et al.
2021/0245267 A1 * 8/2021 Crivella .................. B23B 35/00
2022/0305655 A1 * 9/2022 Utsunomiya .......... B25J 9/1669
2022/0348409 A1 * 11/2022 Sun .......................... B07C 5/36
2023/0050326 A1 2/2023 Lei
2023/0211914 A1 7/2023 Gurberg et al.
2024/0017940 A1 1/2024 Lovett
2024/0043160 A1 2/2024 Ghere
2024/0150139 A1 5/2024 Ringart

* cited by examiner

*Primary Examiner* — Jennifer Bahls
(74) *Attorney, Agent, or Firm* — Dinsmore & Shohl LLP

(57) ABSTRACT

A combined manipulation and marking system for any type of goods, including a robotic manipulator having a numerically controlled arm with an end-effector for grasping and manipulating each of the goods between an incoming location and an outgoing location. A module is provided for marking the goods during manipulation thereof between the incoming and outgoing locations.

21 Claims, 4 Drawing Sheets

ROBOTIC SYSTEM FOR OBJECT MANIPULATION PLACEMENT AND MARKING

CROSS REFERENCE TO RELATED APPLICATIONS

The present application claims the priority of U.S. Ser. No. 63/544,868 filed Oct. 19, 2023.

FIELD OF THE INVENTION

The present invention relates generally to robotic systems. More specifically, the present invention teaches a combined robotic and indicia marking system for providing object manipulation, placement and marking of any type of goods.

BACKGROUND OF THE INVENTION

The prior art is documented with various types of robotic systems, these including what are termed "pick and place" assemblies for gripping and transferring items between designated locations.

The prior art is also documented with various types of indicia marking or labeling systems for any type of goods, including inkjet printing, laser engraving, thermal transfer or ink printing, stamping, UV curing and labeling.

An example of the robotic product labeling system is depicted in Ghere 11,884,444 which teaches a label printer that prints adhesive labels, with a robot arm terminating at a movable end with a suction pad or vacuum device and sensors. The station has sensors configured to measure a height of the item. A processor is coupled to receive the height of the item, to control the robot arm and label printer, and to receive label information from a server. The processor has a memory containing code that computes desired label positions based on height of the container/pallet. A corresponding method of labeling an item includes printing an adhesive label with the label information obtained from a server, receiving the adhesive label on a suction pad or vacuum device attached to a movable end of a robot arm, and determining a first labeling position from measured height of the container/pallet.

Related US 2024/0043160 teaches a label printing station including a transporter adapted to move an item through the label printing station, the item being selected from a container and a pallet bearing the container. A label printer is adapted to print and remove backing from labels, with a robot arm having a plurality of rotators terminating at a movable end in a vacuum device or suction pad and sensors. The robot arm is positioned so the vacuum device or suction pad can reach the labels provided by the label printer and so the robot arm can reach the item on the transporter at a labeling position within the label printing station. At least one sensor is configured to detect arrival of the item in the label printing station and to measure a height of the item. A processor is coupled to receive the height of the item, to control the robot arm and the label printer, and to receive label information from a server, where the processor has a memory containing code.

A corresponding method of labeling an item selected from a container and a pallet bearing a container includes the steps of transporting the item into a label printing station; receiving, from a server, label information; printing an adhesive label with the label information; receiving the adhesive label on a suction pad or vacuum device attached to a movable end of a robot; measuring a height of the item; determining a first labeling position for the item, the first labeling position determined from the measured height of the item; positioning the robot arm with the suction pad or vacuum device at the first labeling position and releasing the adhesive label from the suction pad or vacuum device; retreating the suction pad or vacuum device from the first labeling position; and reading the adhesive label with sensors on the movable end of the robot arm.

US 2024/0150139 teaches a system for handling an item and including a robotic arm having a gripper configured to grip an item located at one or a plurality of storage spaces, transfer the item to a destination and release the item at the destination. A plurality of sensors scan all facts of the item in order to detect identifiable characteristics on any of the facets of the item that facilitate identifying and verifying content of the item and a processor receives the scan data from the plurality of sensors to identify and verify the content of the item based on the detected identifiable characteristics.

US 2023/0211914 teaches a label application system and method for applying labels to packages of various sizes and shapes, adaptable for use in a wide range of facilities. A servo controlled robot includes a gripper for retrieving the label for applying to the package.

US 2024/0017940 discloses a robotic end effector including (a) an end effector body having a top side and an operative side opposite the top side, (b) a pull force gripper disposed on the operative side of the end effector body, and (c) a first end effector support structure that is connected to the end effector body and extends from the end effector body in a direction that is orthogonal to the operative side of the end effector body.

The labeling system of Fan US 2020/0071015 teaches a robotic controlled apparatus arranged to extract the label from a label substrate and move the label to be adjacent to the suitable label placement position. The robotic controlled apparatus is further arranged to apply the label onto the suitable label placement position such that the label is adhere to the object. Finally, U.S. Pat. No. 11,745,509 teaches an inkjet module picked up by a robotic arm via a quick coupling mechanical interface.

SUMMARY OF THE INVENTION

The present invention discloses a pick and place type robotic system having a robotic arm, end effectors, marking modules and a control unit for providing combined transfer and marking of each of a plurality of items. As will be described in further detail with reference to the following description, the present assembly provides for marking of the items (such as including but not limited to fresh produce) to occur at any point prior, during and/or after such as a pick and place operation is performed by a programmable robotic arm having an end-effector configured for grasping, transferring and releasing each item.

Advantages of the present system and assembly include increased efficiency in object manipulation, placement and marking capabilities in order to streamline the overall process, thereby reducing the time and labor required. The present system further provides the flexibility to choose from multiple marking methods, not limited to labelling, printing, etching, engraving, and in order to ensure compatibility with different types of objects and marking requirements. In a preferred application, the marking or indicia applying structure can be incorporated directly into the end effector in order to mark the item as it is being transferred and such as prior to packaging.

Additional advantages provided by the present invention include the automation capabilities reducing reliance on manual labor, with concurrent adaptability allowing for easy integration into existing manufacturing or logistical setups.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention discloses a combined robotic and indicia marking system for providing object manipulation, placement and marking of any type of goods or items including but not limited to fresh produce.

As will be described with reference to the following illustrations, the present invention contemplates any of a variety of different numerically controllable object manipulators, such as a pick and place type robotic system having a robotic arm, end effectors, marking modules and a control unit, for providing combined transfer and marking of each of a plurality of items.

As will be also described, the present assembly provides for marking to occur at any point prior, during or after such as a pick and place operation is performed for each item being transferred and marked. A stationary marking structure is employed in the instance of marking the items prior or subsequent to transfer, such being positioned at location along a first or second conveyor for coming into contact with the items either prior or after acquisition by the end-effector. In a further application, the marking method is integrated directly into the end effector for marking the items during the transfer process which is defined as between acquisition and release positions of the end effector when gripping the item.

Figure 1:
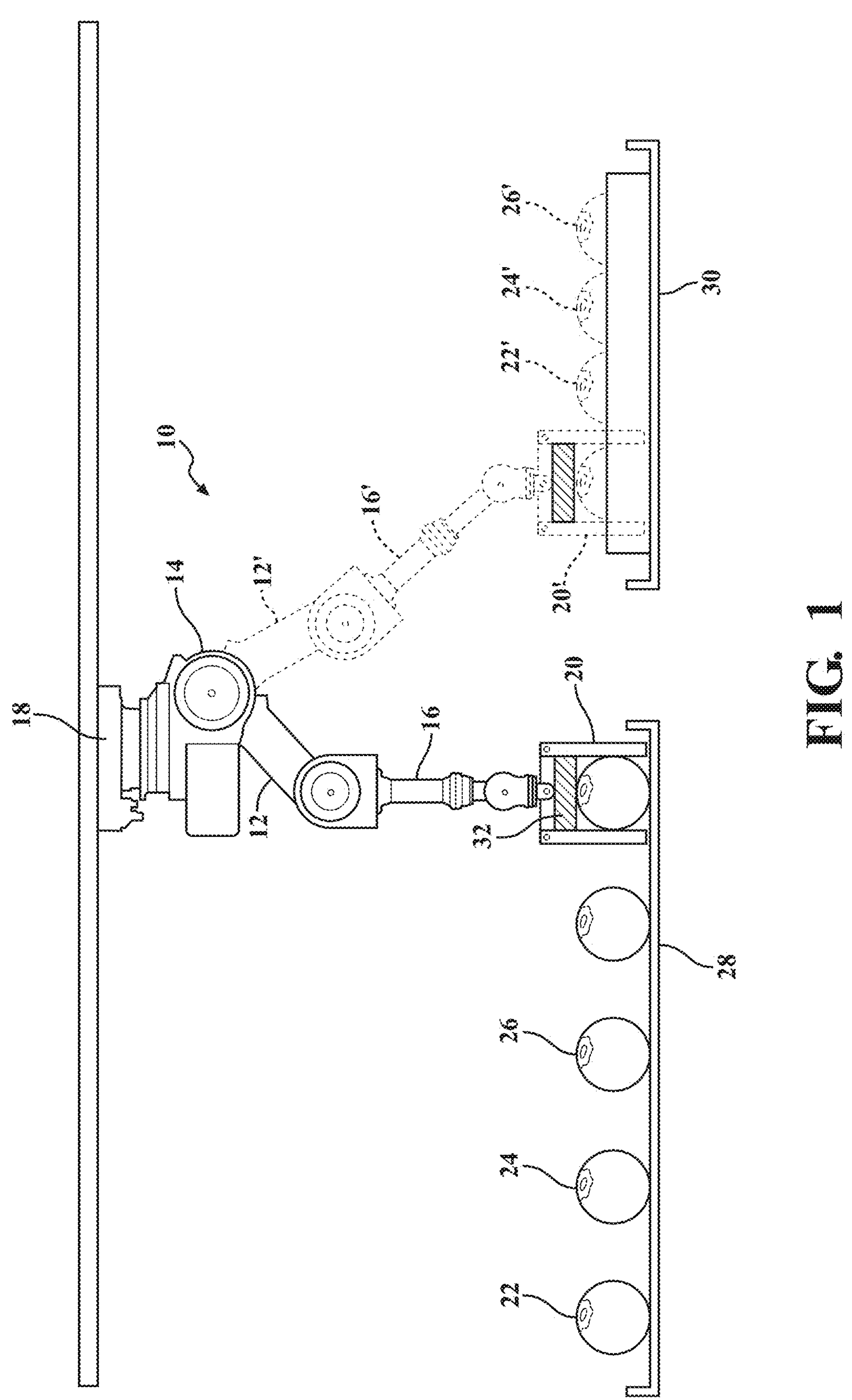
FIG. 1 is an illustration of a first non-limiting variant of the present invention in which pick and place and item marking operations are performed simultaneously.

Referring initially to FIG. 1, an illustration is shown, generally at 10, of a first non-limiting variant of the present invention in which each of pick and place and item marking operations are performed simultaneously. Pick and place robotic assemblies are known in the art and includes a robotic arm (see as represented in FIG. 1 by interconnected arm segments 12, 14 and 16) extending between a robotic manipulator 18 and an end-effector 20.

Pick and place robotic arms are a type of industrial robot which uses advanced technologies to precisely and efficiently handle and move objects in repetitive fashion. Robotic arms are the most common type of pick and place robots and which typically include a five-axis arm used for standard pick and place applications where objects are picked up and moved to other locations in a single plane. A six-axis robotic arm robot is used for more complex applications, such as when objects must be twisted or re-oriented before being placed in another location.

The number of axes determines the degree of freedom and movement of the pick and place robot, with more axes of motion translating into more movement and flexibility. For order fulfillment applications of robots in which items are placed onto a conveyor, picking bin or directly into a packaging container, a robot arm should be provided with four to five axes of motion. Six or more axes of motion are preferable for applications in which the robot needs to rotate or move linearly to handle tasks within its work envelope.

Without limitation, the present invention contemplates either utilizing off the shelf robotic arm technology, such as tied into an existing numerical control subassembly, as well as custom designed robotic arms which are suited for a given task or application.

As is further known, the pick-and-place system is computer numerically controlled to guide the pick and place head (also termed the end effector 20) for ensuring accruable manipulation and placement of a plurality of items of goods (these initially shown at 22, 24, 26 et. seq.) from an incoming location such as inlet conveyor 28 to an outlet conveyor 30 (this corresponding to a marked and packaged stage for the goods or items). Alternatively, the outlet conveyor can be provided as any suitable outlet including any of a plate, turntable, tray or tray insert.

By definition, an end effector is a generic term that includes all the devices installed at a robot wrist to assist it in interacting with the surrounding environment. Synonyms of end effector are end of arm tooling (or EOAT), robot peripherals or robot accessories. Without limitation, end effectors can include any of mechanical grippers, pneumatic grippers or suction cups which can be suited for acquiring, transferring and releasing an item.

End effectors are essential to robotic systems as they handle, manipulate, and sense objects. These devices are the primary means by which robots interact with their environment and perform useful work. As is further known, end effectors can be customized to suit specific applications and can be designed to perform a wide range of tasks, including but not limited to gripping, cutting, welding, and painting.

In one non-limiting application, the end effector can present the item, product or packaging to any of a printing, marking or labeling station within a specified pick and place cell, with the product or item being marked or labeled while the end effector holds/grasps or moves the product/item. This can further envision the end effector tamping the item onto a printed pad or wiping the product across a labeler.

At the outlet location, the robotic arm illustrates manipulated segments 12' and 16' and repositioned end effector 20' for transporting the goods, as further represented at 22', 24', 26', et. seq.). Without limitation, the recitation of "items" or "goods" can include without limitation perishable food items which are transported for packaging, however can also include any other durable items.

As is further known, pick and place robots are commonly used in modern manufacturing environments and, by automation, speeds up the process of picking up parts or items and placing them in other locations. Automating this process helps to increase production rates and to free human workers from handling repetitive tasks allowing them to focus on more complex work.

Typically mounted on a stable stand, pick and place robots are positioned to reach different areas to perform work and often utilize advanced vision systems to identify, grasp and move objects from one place to another. With a variety of design options available, pick and place robots can be configured with various end-of-arm tooling options (not limited to the end effectors 20 described herein) for use in different applications such as assembly, packaging or bin picking. For example, pick and place robot systems may be used to pick up items for an order and place them in a box for packaging, or they may be used to pick up parts needed for assembly and move them to the next location.

Robotic arms, as again illustrated herein, are the most common type of pick and place robots and can commonly include a five-axis arm robot for standard pick and place applications where objects are picked up and moved to other locations in a single plane. A six-axis robotic arm robot is also contemplated for use in more complex applications, such as when objects must be twisted or re-oriented before being placed in another location. In a non-limiting preferred application, one or more robotic arm assemblies can be provided which are traversable along at least one or more axes of motion.

Other robotic assembly options include Cartesian robots which work in multiple planes. These robots move in three orthogonal axes (X, Y and Z) using Cartesian coordinates and can be constructed with any type of linear actuator and several types of drive mechanisms such as belt, ball or lead screw mechanisms, such that they typically have better positioning accuracy compared to 6-axis robotic arms.

Often used in applications where robots pick goods or items in plurality of multiple groups (such as which is further envisioned by the present invention) and place them in assembly patterns or containers, Delta robots are also known and which have advanced vision technologies that enable them to distinguish various sizes, shapes and colors. There are several configurations of Delta robots, but most have three arms that operate on four axes. They have heavy motors affixed to a frame, with lightweight arms connected to linking rods with joints at either end of each arm (typically ball joints) to allow movement.

As is further disclosed in FIG. 1, a marking module 32 is shown which can (without limitation) be integrated into the end effector 20, such as in order to mark or label the goods 22, 24, 26, et seq., sequentially at any point prior, during or following manipulation between the incoming and outgoing locations. In particular, the arrangement of FIG. 1 is suited to provide for marking simultaneous with the manipulation of the goods during the pick and place (and subsequent packaging) operations, with it again being understood that the ability to integrate the marking module within the end effector 20 allows for the marking operation to be performed at any point during the repetitive manipulation and transfer operations.

Figures 4A, 4B:
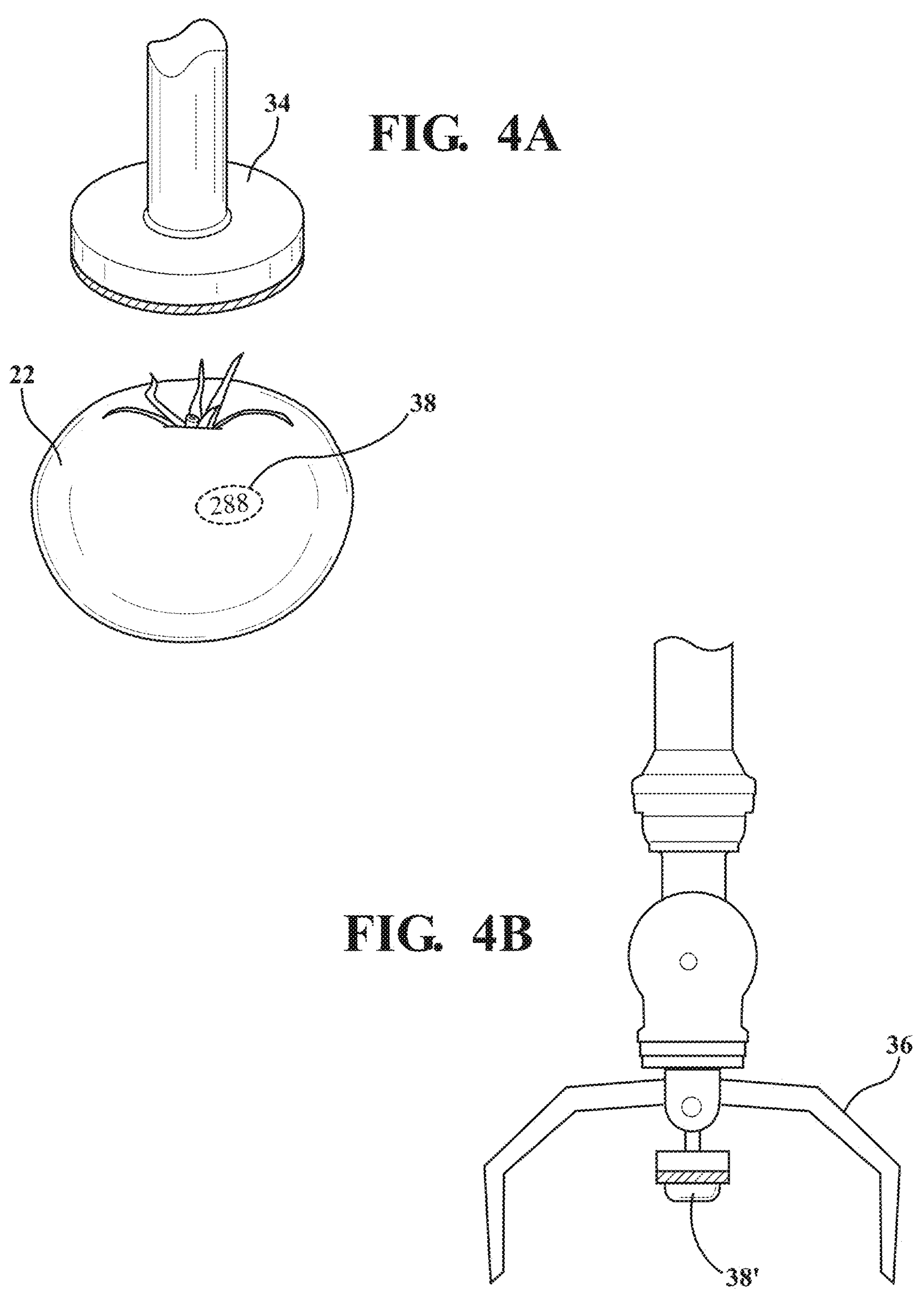
FIGS. 4A and 4B illustrate first and second non-limiting combination end effectors and pre-loaded label marking configurations, such as again associated with the pick and place robotic arm, and which are depicted by either of foam-rimmed or other suction cups, as well as pneumatic or other controlled gripping fingers.

With further reference to FIGS. 4A and 4B, a pair of illustrations are provided as to non-limiting combination end effector and pre-loaded label marking module configurations, such as again associated with the pick and place arm as depicted in FIG. 1. These can include, without limitation, each of foam-rimmed suction cups, at 34 (FIG. 4A) or pneumatic controlled gripping fingers, further at 36 (FIG. 4B), for acquiring, marking and depositing any suitable item 22 (shown in non-limited fashion as a tomato). In addition to the pneumatic gripping fingers, the present invention also envisions utilizing any other type of capturing apparatuses not limited to electrical or other types of powered gripping components.

In the non-limiting representation shown in FIG. 4A, an adhesive label 38 is representatively affixed by the foam rimmed suction cup 34 (such as via an underside applicating portion of the end effector suction cup not shown) to the indicated produce item 22. The end effector with gripping fingers shown in FIG. 4B further representatively depicts a variant 38' of any labeling or marking protocol (which can include any of the alternatives described herein) for application to the item being grasped and transported. Other types of suction cups or gripping fingers are also contemplated beyond those shown which can be incorporated into the robotic pick and place assembly for labeling or marking the items.

Figure 2:
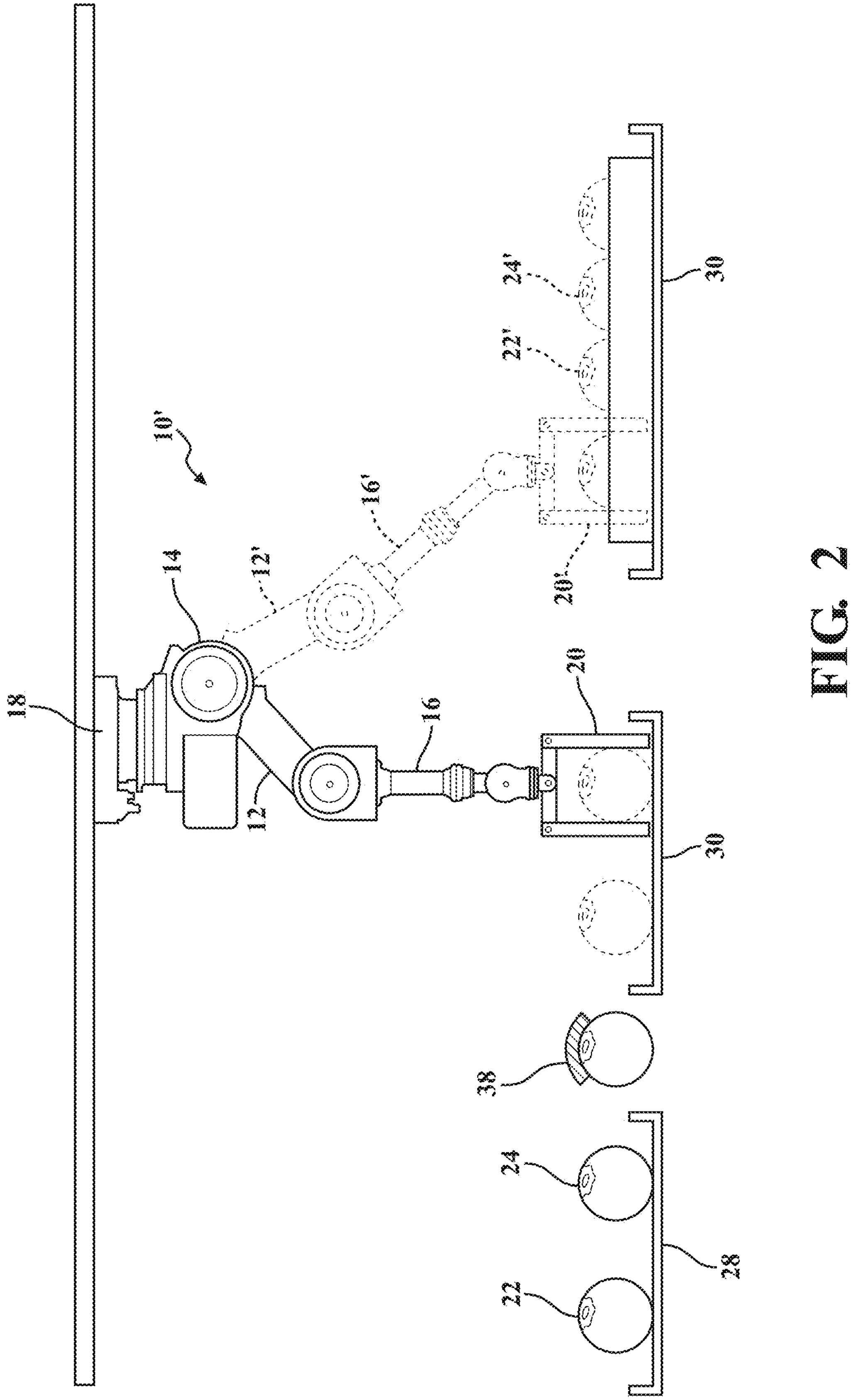
FIG. 2 is an illustration of a second non-limiting variant of the present invention in which an item marking operation is performed prior to a pick and place operation for manipulating and transferring the items.

FIG. 2 is an illustration of a second non-limiting variant, generally at 10', of the present invention in which an item marking operation is performed prior to a pick and place operation for manipulating and transferring the items. Repetitive elements are identically numbered, with FIG. 2 further depicting a repositioned marking module 38 located separate from the end effector 20 at a preliminary point of the inlet location 28 for marking the goods prior to acquisition by the robotic arm at a marked product location (further designated at 40 at the acquisition point for being manipulated by the end effector 20).

Figure 3:
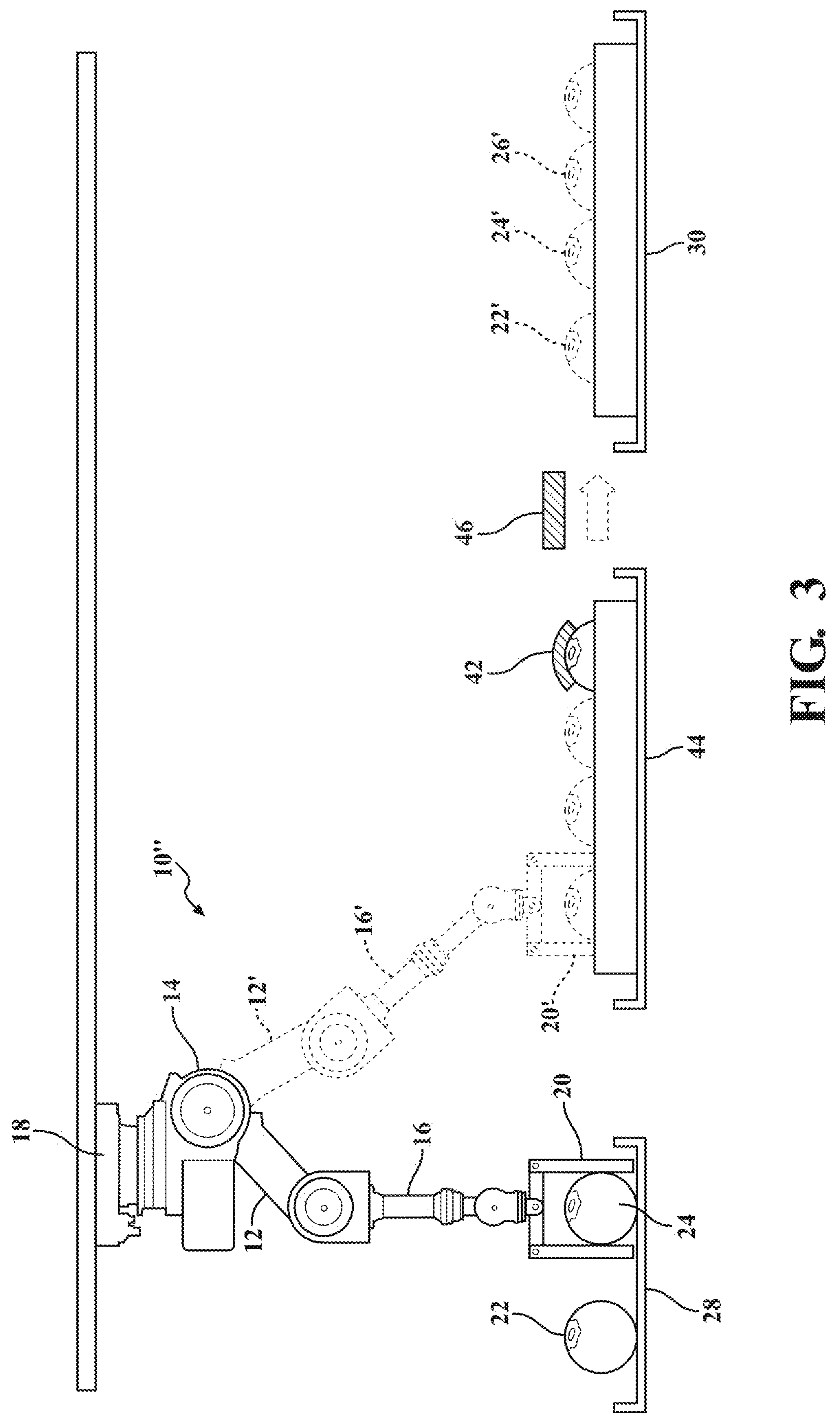
FIG. 3 is an illustration of a third non-limiting variant of the present invention in which an item marking operation is performed following a pick and place operation for manipulating and transferring the items.

FIG. 3 is an illustration, further at 10", of a third non-limiting variant of the present invention in which an item marking operation is performed following a pick and place operation for manipulating and transferring the items. Repetitive elements are again identically numbers, with FIG. 3 depicting a further repositioned marking module 42 positioned in a first arrangement at a further intermediate packaged product stage, at 44. Alternatively, the marking module can be relocated, as shown at 46, following the packaging stage 44 and prior to the finished marked and packaged product stage (again at 30).

As previously described, a variety of commercially available markings or labeling options are envisioned for use with the marking module described herein and which can include any of a label applicating module, an inkjet printing mechanism for dispensing an ink onto the surface of the goods, a laser engraving module for etching or engraving a marking onto the surface of the goods, a thermal transfer printing module for transferring ink from a ribbon onto the surface of the goods using heat, a stamping module for imprinting any of symbols or patterns upon the goods via pressure, or a UV curing module for applying a UV-sensitive ink or coating onto the goods. The present invention also contemplates the labels being pre-printed and applied by the applicating module to the individual items or the packaging according to any of the disclosed embodiments.

Advantages of the present system and assembly include increased efficiency in object manipulation, placement and marking capabilities in order to streamline the overall process, thereby reducing the time and labor required. This can further include reconfiguration of the end-effectors according to any of the afore-mentioned embodiments to enable handling multiple products (again including perishable food items but also contemplating other durable and high volume goods) for achieving speed and efficiency of operation.

The present system further provides the flexibility to choose from multiple marking methods, ensuring compatibility with different types of objects and marking requirement. This can further include, without limitation, other possible marking module configurations which can, for example, a variety of commercially available marking and labeling options not limited to those illustrated and described herein and including, by non-limiting example, the ability to attach tags and the like to pineapple leaves.

Additional functionality associated with the end-effectors can include performing a grading inspection of the product/items at any point prior, during and/or after marking. This can also include the ability to mark or print the object along with adding a label at any point in the process.

Beyond that shown, the definition of product or item can also be extended to include all types of packaging in which the product or package can be marked or labeled prior to placement within a master carton, which is then in turn marked or labelled prior to advancing to a robotic palletizer. In this fashion, the invention can include any pic-and-place robot used for inserting products and packages (such as without limitation cereal boxes) that could be marked or labelled while placing into a master carton, with additional non-limiting examples of master cartons or bags (such as potatoes) being marked or labelled while robotic placing on pallets for shipping.

The present invention further envisions combining one or more individual item labeling/marking protocols, such as described and illustrated herein, along with one or more packaging marking protocols for marking individual packages and master carton, into a comprehensive and multi-stage assembly.

By non-limiting example, the present invention also envisions the mark end-effectors being configured to confirm the quality of the product/item prior to labeling or which can determine the optimal location where to apply the mark or label, as well as to confirm that the mark has been applied. This can also envision the integration of suitable scanner technology into the end effector modules or other suitable locations for inspecting each item prior or concurrent with the labeling, etching, or printing according to any of the disclosed embodiments.

Additional advantages include automation capabilities for reducing reliance on manual labor, with concurrent adaptability allowing for easy integration into existing manufacturing or logistical setups.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A combined manipulation and marking system for any type of goods, comprising:

a robotic manipulator including a numerically controlled arm with an end-effector for grasping and manipulating each of a plurality of the goods between an incoming location and an outgoing location;

said arm with end-effector operating under a pick-and-place operational protocol for acquiring and transporting each of the goods, said end-effector acquiring each of the goods in succession at the incoming location for transit between the incoming and outgoing locations and prior to said end-effector releasing each of the goods at the outgoing location; and a module integrated into said end effector for individually marking the goods while being grasped by said end effector at any point prior, during, or after transfer thereof between the incoming and outgoing locations.

2. The system of claim 1, further comprising an inlet conveyor associated with said incoming location and an outlet associated with said outgoing location.

3. The system of claim 2, said outlet further comprising an outlet conveyor.

4. The system of claim 3, further comprising a packaging operation associated with said outlet conveyor associated with said outgoing location.

5. The system of claim 2, said outlet further comprising any of a plate, turntable, tray or tray insert.

6. The system of claim 1, said marking module further comprising a label applicating module.

7. The system of claim 1, said marking module further comprising an inkjet printing mechanism for dispensing an ink onto the surface of the goods.

8. The system of claim 1, said marking module further comprising a laser engraving module for etching or engraving a marking onto the surface of the goods.

9. The system of claim 1, said marking module further comprising a thermal transfer printing module for transferring ink from a ribbon onto the surface of the goods using heat.

10. The system of claim 1, said marking module further comprising a stamping module for imprinting any of symbols or patterns upon the goods via pressure.

11. The system of claim 1, said marking module further comprising a UV curing module for applying a UV-sensitive ink or coating onto the goods.

12. A combined manipulation and marking system for any type of goods, comprising:

a robotic manipulator including a numerically controlled arm with an end-effector for grasping and manipulating each of a plurality of the goods between an incoming location and an outgoing location;

said arm with end-effector operating under a pick-and-place operational protocol for gripping and transporting each of the goods between the incoming and outgoing locations; and a marking module integrated into said end-effector for marking the goods at any point prior, during or after their successive transfer thereof between the incoming and outgoing locations and while being grasped by the end-effector.

13. The system of claim 12, further comprising an inlet conveyor associated with said incoming location and any of an outlet or outlet conveyor associated with said outgoing location.

14. The system of claim 13, further comprising a packaging operation associated with said outlet conveyor associated with said outgoing location.

15. The system of claim 13, said outlet further comprising any of a plate, turntable, tray or tray insert.

16. The system of claim 12, said marking module further comprising a label applicating module.

17. The system of claim 12, said marking module further comprising an inkjet printing mechanism for dispensing an ink onto the surface of the goods.

18. The system of claim 12, said marking module further comprising a laser engraving module for etching or engraving a marking onto the surface of the goods.

19. The system of claim 12, said marking module further comprising a thermal transfer printing module for transferring ink from a ribbon onto the surface of the goods using heat.

20. The system of claim 12, said marking module further comprising a stamping module for imprinting any of symbols or patterns upon the goods via pressure.

21. The system of claim 12, said marking module further comprising a UV curing module for applying a UV-sensitive ink or coating onto the goods.

* * * * *